(12) United States Patent
Kimura

(10) Patent No.: US 12,039,308 B2
(45) Date of Patent: Jul. 16, 2024

(54) INFORMATION PROCESSING DEVICE AND COMPILER METHOD

(71) Applicant: Fujitsu Limited, Kawasaki (JP)

(72) Inventor: Shigeru Kimura, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/160,418

(22) Filed: Jan. 27, 2023

(65) Prior Publication Data

US 2023/0367570 A1    Nov. 16, 2023

(30) Foreign Application Priority Data

May 10, 2022    (JP) ................. 2022-077718

(51) Int. Cl.
*G06F 8/41* (2018.01)
*G06F 9/32* (2018.01)

(52) U.S. Cl.
CPC .............. *G06F 8/452* (2013.01); *G06F 8/443* (2013.01); *G06F 9/325* (2013.01)

(58) Field of Classification Search
CPC ........... G06F 9/325; G06F 8/443; G06F 8/452
See application file for complete search history.

(56) References Cited

U.S. PATENT DOCUMENTS

| | | | | |
|---|---|---|---|---|
| 2007/0083730 A1* | 4/2007 | Vorbach | .............. | G06F 15/7867 712/E9.067 |
| 2012/0254551 A1* | 10/2012 | Kasahara | ............ | G06F 12/0842 711/143 |
| 2014/0157248 A1* | 6/2014 | Kimura | ................. | G06F 8/4442 717/151 |
| 2017/0017475 A1 | 1/2017 | Tabaru | | |

FOREIGN PATENT DOCUMENTS

JP    2017-021726 A    1/2017

OTHER PUBLICATIONS

Oseledets et al., "Tucker Dimensionality reduction of three-dimensional arrays in linear time" (Year: 2008).*
Doerfert et al., "Optimistic Loop Optimization" (Year: 2017).*
Kim et al., "Improving Performance of Nested Loops on Reconfigurable Array Processors" (Year: 2012).*

* cited by examiner

*Primary Examiner* — Phillip H Nguyen
(74) *Attorney, Agent, or Firm* — STAAS & HALSEY LLP

(57) ABSTRACT

A non-transitory computer-readable recording medium stores a program for causing a computer to execute a process, the process includes determining, for an n-dimensional array (n≥3) included in an instruction code in an innermost loop of a multiple loop included in a source code, whether array sizes of a first argument and a second argument match numbers of rotations of a first index and a second index in the multiple loop, respectively, when the array sizes match the numbers of rotations and when each initial value and each increment value of the first and second indexes is 1, replacing the first argument and the second argument of the n-dimensional array included in the instruction code with a third argument and changing the n-dimensional array to an (n−1)-dimensional array, and integrating a loop that uses the first index and a loop that uses the second index.

8 Claims, 16 Drawing Sheets

FIG. 2

```
do z=1,30
  do y=1,20
    do x=1,10
        b3(mod(x,3)+1,y,z)=a3(mod(x,3)+1,y,z)
    end do
  end do
end do
```

FIG. 3

| NESTING LEVEL | CONTROL VARIABLE | INITIAL VALUE | FINAL VALUE | INCREMENT VALUE | ARRAY SYNTAX INFORMATION | SIBLING FLAG |
|---|---|---|---|---|---|---|
| 1 | x | 1 | 10 (CONSTANT) | 1 | ARRAY SYNTAX INFORMATION ADDRESS | 0 |
| 2 | y | 1 | 20 (CONSTANT) | 1 | - | 0 |
| 3 | z | 1 | 30 (CONSTANT) | 1 | - | 0 |
| ... | ... | ... | VARIABLE LOOP 1 | 2 | - | ... |
| ... | ... | ... | ... | ... | ... | ... |

22

Offset3(A(i,j,t(k))) = {(i-1)+x*(j-1)+ *y*(t(k)-1)}*L

CASE OF ARRAY A(ij, 1, t(k)),
Offset3(A(ij,1,t(k))) = {(ij-1)+x*y*(t(k)-1)}*L

CASE OF A((ij, t(k))
　　Offset2(A(ij,t(k))) = {(ij-1)+(x*y)*(t(k)-1)}*L

Offset3(A(ij,1,t(k))) = Offset2(A(ij,t(k)))

LOOP NEST REDUCTION, CHANGE TO TWO-DIMENSIONAL ARRAY

FIG. 8A a3(*,y,z) → a3(*,yz,1)
b3(*,y,z) → b3(*,yz,1)

```
do z=1,30
 do y=1,20
  do x=1,10
   b3(mod(x,3)+1,y,z)=a3(mod(x,3)+1,y,z)
  end do
 end do
end do
```
~21

⇒

```
do yz=1,20*30
 do x=1,10
  b3(mod(x,3)+1,yz,1)=a3(mod(x,3)+1,yz,1)
 end do
end do
```

FIG. 8B

EXAMPLE a

NEST REDUCTION a BASED ON LOOP INTEGRATION

```
do w=1,40
  do z=1,30
    do y=1,20
      do x=1,10
        b4(mod(x,3)+1,y,z,w)=
a4(mod(x,3)+1,y,z,w)
      end do
    end do
  end do
end do
```

```
do yzw=1,20*30*40
  do x=1,10
    b4(mod(x,3)+1,yzw,1,1)=
a4(mod(x,3)+1,yzw,1,1)
  end do
end do
```

FIG. 8C

EXAMPLE b

NEST REDUCTION b BASED ON LOOP INTEGRATION

```
do a=1,50
  do w=1,40
    do z=1,30
      do y=1,20
        do x=1,10
          b5(x,y,mod(z,DV1)+1,w,a)=
a5(x,y,mod(z,DV1)+1,w,a)
        end do
      end do
    end do
  end do
end do
```

```
do wa=1,40*50
  do z=1,30
    do xy=1,10*20
      b5(xy,1,mod(z,DV1)+1,wa,1)
=a5(xy,1,mod(z,DV1)+1,wa,1)
    end do
  end do
end do
```

```
do i=1,N
  do j=1,N
    do k=1,N
      C(k,j,i)=A(k,j,i)*B(k,j,i)
      ...
    end do;
  end do;
end do
```

```
do I=1,N*N*N
   CX(I)=CA(I)*CB(I)
   ...
end do
```

INFORMATION PROCESSING DEVICE AND COMPILER METHOD

CROSS-REFERENCE TO RELATED APPLICATION

This application is based upon and claims the benefit of priority of the prior Japanese Patent Application No. 2022-77718, filed on May 10, 2022, the entire contents of which are incorporated herein by reference.

FIELD

The embodiment discussed herein is related to an information processing device and a compiler method.

BACKGROUND

As a compiler optimization method, there is Loop collapse, which makes array processing of multidimensional loops into a single loop. Loop collapse (hereafter also referred to as Lc) is a process in which, for example, processing that accesses a three-dimensional array area with triple loops is regarded as processing that accesses a one-dimensional array area with a single loop.

FIG. 12 is a diagram illustrating loop unification of a three-dimensional array. As illustrated in FIG. 12, three-dimensional arrays C(k, j, i), A(k, j, i) and B(k, j, i) to be processed by triple loops are replaced with one-dimensional arrays CX(I), CA(I), and CB(I) to be processed by a single loop, respectively.

As a result, the Lc optimization process is enabled to reduce branch instructions in loops as loop nests are reduced. With the branch instructions reduced, the Lc optimization process is enabled to efficiently use a branch table to be used for branch prediction, which is a limited hardware resource. Furthermore, since a loop length (number of instructions in the loop) becomes longer, it becomes easier to optimize a software pipeline or the like, which is effective when the loop length is long. Furthermore, according to the Lc optimization process, a loop index (hereinafter, also referred to as index) is optimized to change the design such that an access is gained from inside the innermost loop array prior to the unification process, whereby a memory is accessed continuously instead of being accessed in a discontinuous manner. As a result, cache efficiency improves, and hardware prefetching for contiguous area access or the like is applied, thereby improving data access efficiency.

That is, Loop collapse is an optimization method that focuses on making the array one-dimensional and achieving the contiguous area memory access.

Furthermore, there is a loop unrolling function as a compiler optimization method. The loop unrolling function is a function for increasing a program processing speed by expanding simple repetitive processing to reduce the number of loop processes. With the branch instructions reduced, the loop unrolling function is enabled to efficiently use the branch table to be used for branch prediction, which is a limited hardware resource. Furthermore, according to the loop unrolling function, a length of an instruction sequence (basic block) not including a branch instruction becomes long so that many combinations of instruction replacement and register usage ranges are available, whereby the optimization may be facilitated.

Japanese Laid-open Patent Publication No. 2017-21726 is disclosed as related art.

SUMMARY

According to an aspect of the embodiment, a non-transitory computer-readable recording medium stores a program for causing a computer to execute a process, the process includes determining, for an n-dimensional array ($n \geq 3$) included in an instruction code in an innermost loop of a multiple loop included in a source code, whether array sizes of a first argument and a second argument match numbers of rotations of a first index that corresponds to the first argument and a second index that corresponds to the second argument in the multiple loop, respectively, the multiple loop being a loop with a hierarchical structure in which loops are nested, when the array sizes match the numbers of rotations, respectively, and when an initial value of each of the first index and the second index is 1 and an increment value of each of the first index and the second index is 1, replacing the first argument and the second argument of the n-dimensional array included in the instruction code with a third argument and changing the n-dimensional array to an (n−1)-dimensional array, and integrating a first loop that uses the first index and a second loop that uses the second index.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an exemplary source program;

FIG. 3 is a diagram illustrating an exemplary loop management table;

FIG. 8A is a diagram (1) illustrating exemplary optimization according to the embodiment;

FIG. 8B is a diagram (2) illustrating exemplary optimization according to the embodiment;

FIG. 8C is a diagram (3) illustrating exemplary optimization according to the embodiment;

DESCRIPTION OF EMBODIMENT

There is a problem that it may not be possible to optimize compilation in source code including array processing of multidimensional loops. For example, according to the Lc optimization for making loops into a single loop, while the array is made one-dimensional and the contiguous area access is achieved so that improvement in the performance is expected, the optimization may not be performed when the contiguous area access is not achieved. That is, the optimization may not be performed when it fails to be replaced with a one-dimensional array completely processed by a single loop.

Furthermore, according to the optimization based on the loop unrolling function, while it may contribute to the effect of reducing the branch table of the hardware resource, the code size of the basic block increases, and a phenomenon that the number of executions per code in the basic block decreases occurs. That is, code efficiency is lowered. Furthermore, when the code size of the basic block increases, application efficiency of a hardware mechanism (short loop mechanism), which temporarily stores the instruction sequence in an instruction buffer and directly retrieves the instruction from the instruction buffer to execute it by skipping instruction decoding, is lowered. Furthermore, when the code size of the basic block increases, the number of instructions of the basic block increases, which lowers the cache efficiency.

Hereinafter, an embodiment of an information processing device and a compiler method disclosed in the present application will be described in detail with reference to the drawings. Note that the present disclosure is not limited by the embodiment.

Embodiment

Figure 1:
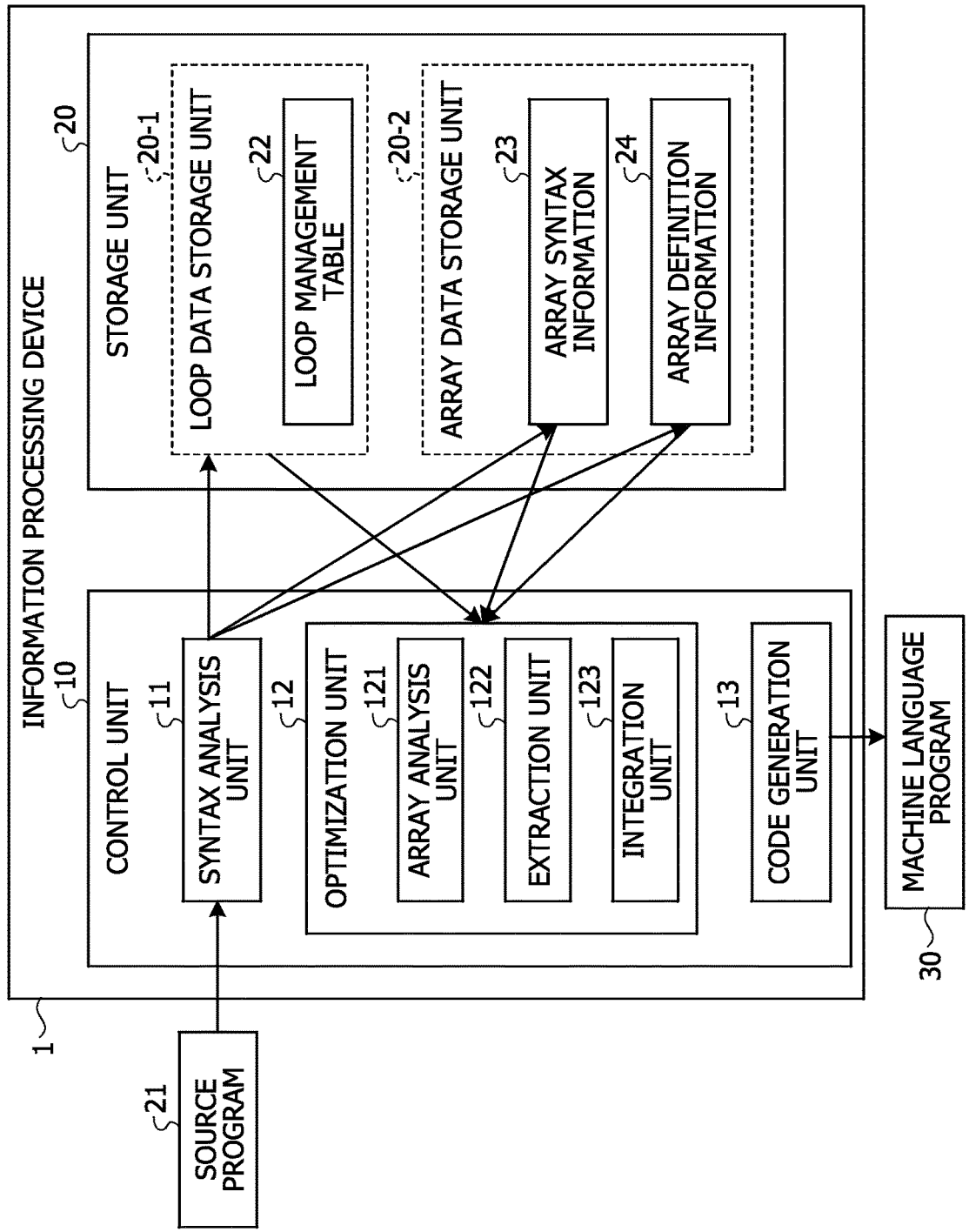
FIG. 1 is a diagram illustrating an exemplary functional configuration of an information processing device according to an embodiment.

Functional Configuration of Information Processing Device According to Embodiment FIG. 1 is a diagram illustrating an exemplary functional configuration of the information processing device according to the embodiment. An information processing device 1 illustrated in FIG. 1 is concerned with a compiler optimization method of a source program 21 including a multiple loop, reduces loop nests, increases the number of loop rotations, and increases the number of executions per code in a basic block. As a result, the information processing device 1 is enabled to reduce branch instructions in the loop by reducing loop nests, and is enabled to efficiently use a branch table to be used for branch prediction. Furthermore, the information processing device 1 is enabled to increase the number of executions per code in the basic block by reducing the loop nests, and is enabled to increase loop execution density. Additionally, the information processing device 1 is enabled to improve application efficiency of a hardware mechanism (short loop mechanism), which temporarily stores an instruction sequence in an instruction buffer and directly retrieves the instruction from the instruction buffer to execute it by skipping instruction decoding. Note that the multiple loop indicates a loop with a hierarchical structure in which loops are nested. The basic block indicates an instruction sequence that does not include a branch instruction.

Here, an example of the source program 21 handled by the information processing device 1 according to the embodiment will be described with reference to FIG. 2. FIG. 2 is a diagram illustrating an exemplary source program. FIG. 2 illustrates the source program 21 written in the FORTRAN language. The source program 21 illustrated in FIG. 2 is a program that processes a three-dimensional array with triple loops. For each DO loop, a control variable "x" in which a nesting level is "1" indicates an initial value of "1", a final value of "10", and an increment value of "1". A control variable "y" in which the nesting level is "2" indicates the initial value of "1", the final value of "20", and the increment value of "1". A control variable "z" in which the nesting level is "3" indicates the initial value of "1", the final value of "30", and the increment value of "1". Although illustration is omitted, an array size is written in the source program 21 as an array declaration. Although an exemplary case where the source program 21 processes a three-dimensional array with triple loops has been described here, the number of dimensions of the array and the number of loops are not limited. Furthermore, the language is also not limited to FORTRAN, and may be C language or the like.

Returning to FIG. 1, the information processing device 1 includes a control unit 10 and a storage unit 20. The control unit 10 includes a syntax analysis unit 11, an optimization unit 12, and a code generation unit 13. The storage unit 20 includes a loop data storage unit 20-1 and an array data storage unit 20-2. The loop data storage unit 20-1 stores information related to loops written in the source program 21. The loop data storage unit 20-1 includes a loop management table 22. The array data storage unit 20-2 stores information related to arrays written in the source program 21. The array data storage unit 20-2 includes array syntax information 23 and array definition information 24.

The loop management table 22 is information related to loops in each multiple loop written in the source program 21. Note that the loop management table 22 is generated by the syntax analysis unit 11 to be described later.

Here, an example of the loop management table 22 will be described with reference to FIG. 3. FIG. 3 is a diagram illustrating an example of the loop management table. As illustrated in FIG. 3, the loop management table 22 stores, for one multiple loop, a nesting level, a control variable, an initial value, a final value, an increment value, array syntax information, and a sibling flag in association with each other. The nesting level indicates a depth of loop nesting with the innermost loop set as 1. The control variable indicates a variable that controls an index. The initial value indicates an initial value of the control variable. The final value indicates a final value of the control variable. The final value is a constant. The increment value indicates an increment value of the control variable. The array syntax information indicates an address of the array syntax information 23 of the array corresponding to the multiple loop. Note that the array syntax information 23 will be described later.

The sibling flag is a flag indicating whether or not processing other than loops is included in parallel within the nesting of the hierarchical structure of the loops. For example, in the case of the FORTRAN language, the sibling flag is set to "1" when processing other than the DO statements is included and is set to "0" when processing other than the DO statements is not included in parallel within the nesting of the hierarchical structure of the loops.

As an example, when the nesting level is "1", "x" as the control variable, "1" as the initial value, "10" as the final value, "1" as the increment value, array syntax information address as the array syntax information, and "0" as the sibling flag are stored. When the nesting level is "2", "y" as the control variable, "1" as the initial value, "20" as the final value, "1" as the increment value, "-" as the array syntax information, and "0" as the sibling flag are stored. When the nesting level is "3", "z" as the control variable, "1" as the initial value, "30" as the final value, "1" as the increment value, "-" as the array syntax information, and "0" as the sibling flag are stored.

The array syntax information 23 is syntax information of arrays written in the source program 21. The array syntax information 23 is a table that stores a subscript for each subscript dimension of the array corresponding to the nesting level of the loop. Note that the array syntax information 23 is generated by the syntax analysis unit 11 to be described later.

Figure 4:
FIG. 4 is a diagram illustrating exemplary array syntax information.

Here, an example of the array syntax information 23 will be described with reference to FIG. 4. FIG. 4 is a diagram illustrating an example of the array syntax information 23. As illustrated in FIG. 4, the array syntax information 23 is information in which a subscript dimension and a subscript are associated with an array name. The subscript indicates a number for each subscript dimension assigned to the element indicated by the array, and is given by a variable. The subscript may be given by a function. As an example, when the array name is "a3", a function "mod(x, 3)+1" for the subscript with the subscript dimension "1", a variable "y" for the subscript with the subscript dimension "2", and a variable "z" for the subscript with the subscript dimension "3" are stored. This information is for the case where the array is a3(mod(x, 3)+1, y, z). Similarly, when the array name is "b3", the function "mod(x, 3)+1" for the subscript with the subscript dimension "1", the variable "y" for the subscript with the subscript dimension "2", and the variable "z" for the subscript with the subscript dimension "3" are stored. This information is for the case where the array is b3(mod(x, 3)+1, y, z).

Returning to FIG. 1, the array definition information 24 is definition information of arrays written in the source program 21. Note that the array definition information 24 is generated by the syntax analysis unit 11 to be described later.

Figure 5:
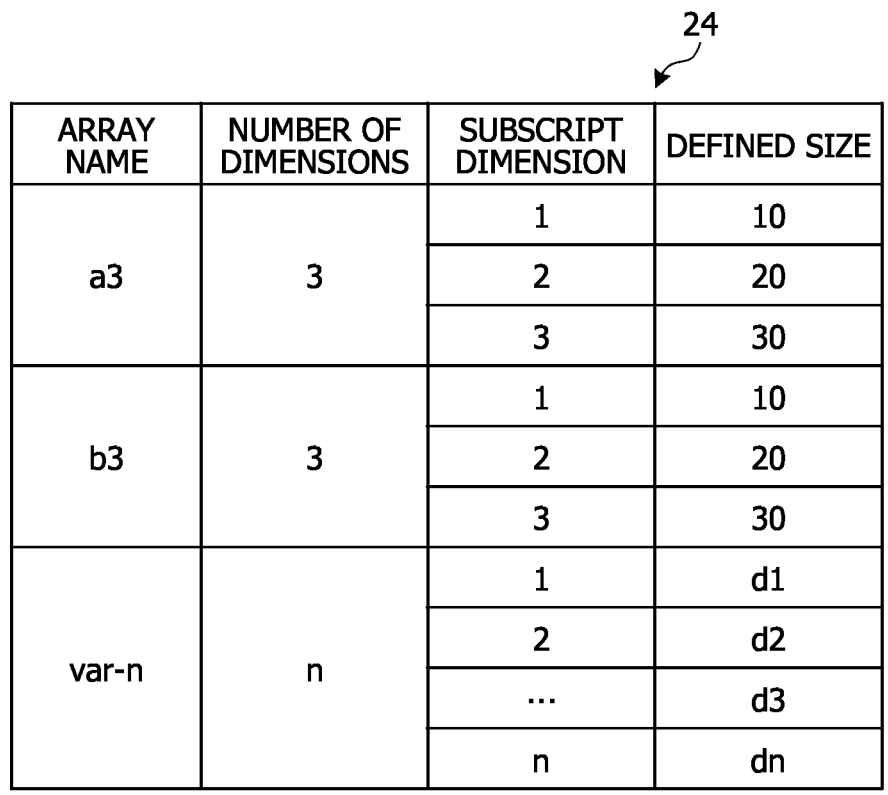
FIG. 5 is a diagram illustrating exemplary array definition information.

Here, an example of the array definition information 24 will be described with reference to FIG. 5. FIG. 5 is a diagram illustrating an example of the array definition information 24. As illustrated in FIG. 5, the array definition information 24 is information in which an array name, the number of dimensions, a subscript dimension, and a defined size are associated with each other. The number of dimensions indicates the number of dimensions of the array indicated by the array name. The subscript dimension corresponds to the subscript dimension of the array syntax information 23. The defined size is a size of the array for each subscript dimension.

As an example, when the array name is "a3", "3" is stored as the number of dimensions. Then, "10" as the defined size for the subscript dimension "1", "20" as the defined size for the subscript dimension "2", and "30" as the defined size for the subscript dimension "3" are stored.

Returning to FIG. 1, the syntax analysis unit 11 analyzes the syntax of the source program 21. For example, the syntax analysis unit 11 analyzes loops written in the source program 21, and stores the analysis result in the loop management table 22. The syntax analysis unit 11 analyzes arrays in the loop written in the source program 21, and stores the analysis result in the array syntax information 23 and the array definition information 24. As an example, the syntax analysis unit 11 analyzes an array declaration written in the source program 21, and stores, in the array definition information 24, the defined size for each subscript dimension for the analyzed array name.

The optimization unit 12 optimizes the source program 21. The optimization unit 12 includes an array analysis unit 121, an extraction unit 122, and an integration unit 123. Note that the array analysis unit 121 is an example of a determination unit and a change unit. The extraction unit 122 is an example of the change unit. The integration unit 123 is an exemplary integration unit.

The array analysis unit 121 determines, for an n-dimensional array (n≥3) included in an instruction code in the innermost loop, whether or not the array sizes of the first subscript and the second subscript match the numbers of rotations of the first index corresponding to the first subscript and the second index corresponding to the second subscript in the multiple loop, respectively. Note that the array analysis unit 121 refers to the loop management table 22, and sets a sibling process as a separate process when the sibling flag is set at any nesting level of the target multiple loop. For example, the array analysis unit 121 performs loop division of the sibling process, performs conversion into a multiple loop configuration not including the sibling process, and then analyzes the array. Thereafter or in parallel with this, the array analysis unit 121 analyzes the array of the sibling process.

For example, the array analysis unit 121 selects an array included in the instruction code in the innermost loop of the multiple loop. The array analysis unit 121 determines whether the following conditions <1> and <2> are satisfied with respect to a subscript dimension k from 1 to n (number of dimensions) of the selected array.

<1> The subscript corresponding to the subscript dimension k of the target array in the array syntax information 23 matches the control variable corresponding to the same nesting level k as the subscript dimension k in the loop management table 22.

<2> In the loop management table 22, the initial value corresponding to the nesting level k is "1", the increment value is "1", and the final value matches the defined size corresponding to the subscript dimension k in the array definition information 24. That is, the condition <2> determines whether or not the number of loop rotations at the nesting level k matches the defined array size of the subscript dimension k.

In a case where the extraction unit 122 determines that the conditions <1> and <2> are satisfied for consecutive subscript dimensions of the n-dimensional array included in the instruction code, it extracts loops at the nesting levels corresponding to the consecutive subscript dimensions as reduction targets.

The integration unit 123 replaces the first subscript and the second subscript of the n-dimensional array included in the instruction code with a subscript of another name to change the array to an (n−1)-dimensional array. In addition, the integration unit 123 deletes the loop using the first index corresponding to the first subscript, and change the final value of the second index corresponding to the subscript of the another name, thereby integrating the loops.

For example, the integration unit 123 sets a smaller dimension of the consecutive subscript dimensions determined to satisfy the conditions <1> and <2> for the array as a replacement dimension, and replaces the subscript of the replacement dimension with the subscript (control variable)

obtained by concatenating the subscripts of the individual dimensions. Then, the integration unit 123 replaces the array in the multiple loop.

In addition, the integration unit 123 deletes the loops at the nesting levels other than the maximum dimension among the consecutive subscript dimensions. Then, the integration unit 123 refers to the loop management table 22, and changes the final value of the loop of the maximum dimension to a value obtained by multiplying the final values at the nesting levels corresponding to the consecutive subscript dimensions. Then, the integration unit 123 changes the control variable of the corresponding loop to the control variable (subscript) replaced in the array.

The code generation unit 13 converts the changed source program into intermediate code. Then, the code generation unit 13 converts the intermediate code into a machine language program 30.

Description of Optimization

Here, the optimization according to the embodiment will be described with reference to FIGS. 6A to 6D. FIGS. 6A to 6D are diagrams illustrating the optimization according to the embodiment.

Figure 6A:
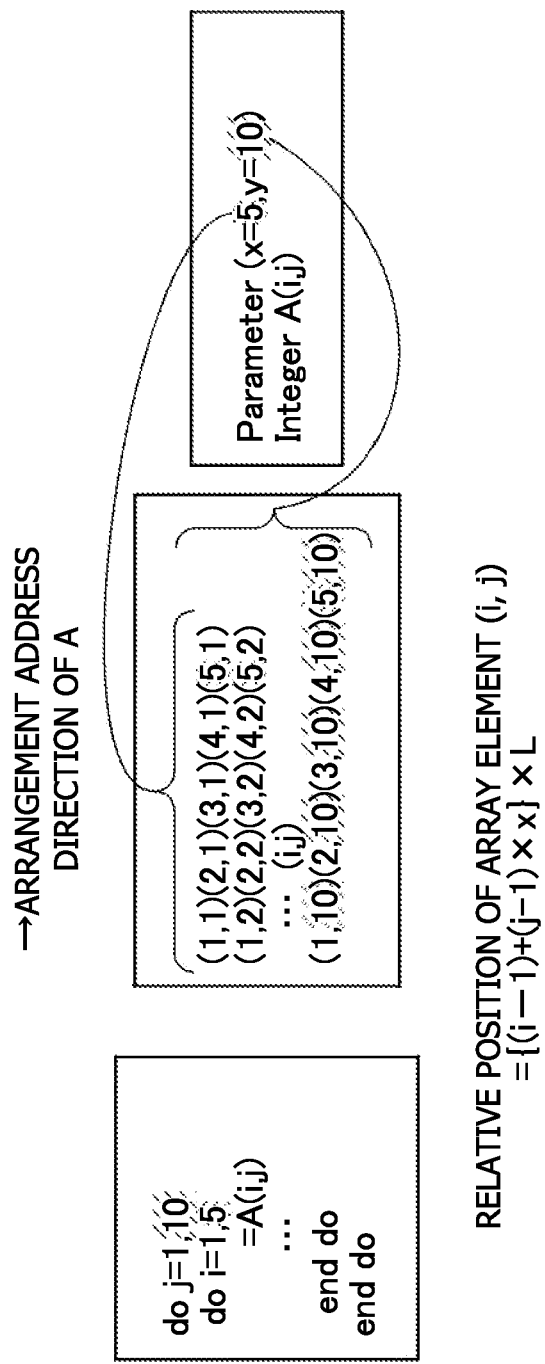
FIG. 6A is a diagram (1) illustrating optimization according to the embodiment.

First, memory access to a two-dimensional array A(i, j) with an array size of (x, y) will be considered with reference to FIG. 6A. Here, as illustrated in the right figure in FIG. 6A, the array size is assumed to be declared with x set to "5" and y set to "10". It is assumed that the source program 21 partially includes the program illustrated in the left figure in FIG. 6A. The two-dimensional array A(i, j) is written in the innermost loop. In such source program 21, when the subscript j is 1, the address of the two-dimensional array A(i, 1) is accessed in order of the subscript i of the innermost loop from 1 to 5. Next, when the subscript j is 2, the address of the two-dimensional array A(i, 2) is accessed in order of the subscript i of the innermost loop from 1 to 5.

The relative position of the array element of the subscript (i, j) from the top area of such two-dimensional array A may be obtained by the following equation (1), where an element size is assumed to be L. L is 4 bytes when it is an integer.

Relative position of the array element of the subscript $(i,j) = \{(i-1)+(j-1)*x\}*L$     (1)

For example, as illustrated in the center figure in FIG. 6A, the relative position of the array element of A(1, 1) is 0. The relative position of the array element of A(2, 1) is 1. The relative position of the array element of A(5, 1) is 4. The relative position of the array element of A(5, 2) is 9. Accordingly, at the time of such source program 21 and array size, the memory of such array size is accessed in ascending order.

Similarly, at a time of a three-dimensional array A(i, j, k) with the element size of L, the relative position of the array element of the subscript (i, j, k) from the top area of the three-dimensional array A may be obtained by the following equation (2).

Relative position of the array element of the subscript $(i,j,k) = \{(i-1)+(j-1)*x+(k-1)*(x*y)\}*L$     (2)

As a premise, the multiple loop needs to be mapped such that the memory is accessed in order from the smallest dimension of the subscripts of the array A to access the memory in the arrangement address direction (in ascending order) of the array A.

Figure 6B:
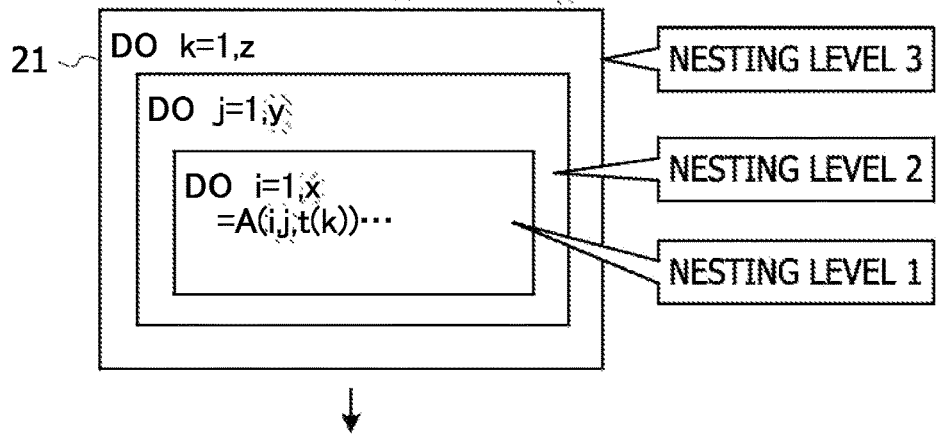
FIG. 6B is a diagram (2) illustrating the optimization according to the embodiment.
Figure 6B:
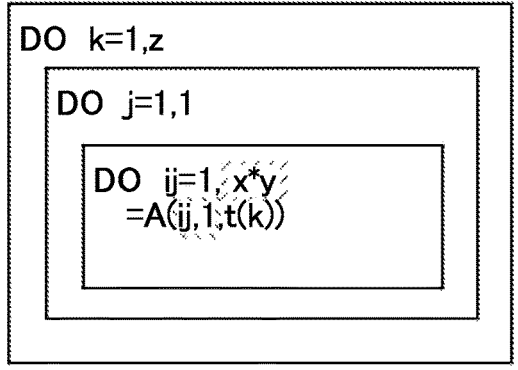
Figure 6B:
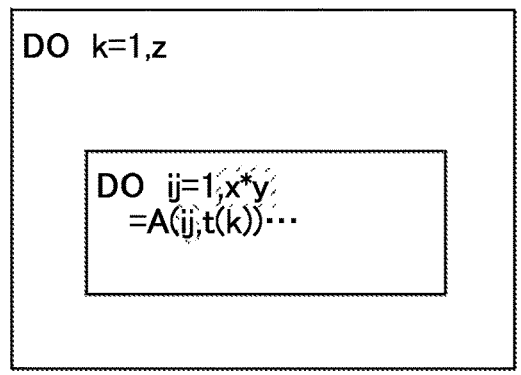

As illustrated in FIG. 6B, a memory access is assumed to be gained for the three-dimensional array A(i, j, k) with the array size of (x, y, z). Here, the source program 21 is assumed to be the program illustrated in the upper part of FIG. 6B. The three-dimensional array A(i, j, t(k)) is written in the innermost loop. The subscript of such a three-dimensional array A with the subscript dimension of "3" is "t(k)", which is the number calculated by a function "t(k)" using a loop variable k of the outermost loop.

The offset Offset3 of the position from the top area of such a three-dimensional array A may be obtained by the following equation (3) using the equation (2), where an element size is assumed to be L.

Offset3$(A(i,j,t(k))) = \{(i-1)+(j-1)*x+(t(k)-1)*(x*y)\}*L$     (3)

Here, the offset offset3 of the position from the top area of the three-dimensional array A(ij, 1, t(k)) when the subscript of the subscript dimension "2" is set to "1" and the subscript of the subscript dimension "1" is set to "ij" for the three-dimensional array A may be obtained by the following equation (4) using the equation (2).

Offset3$(A(ij,1,t(k))) = \{(ij-1)+(t(k)-1)*(x*y)\}*L$     (4)

The source program 21 of such a three-dimensional array A is illustrated in the middle part of FIG. 6B. For the three-dimensional array A, the subscript of the subscript dimension "2" is "1", and the subscript of the subscript dimension "1" is "ij". In addition, the final value of the control variable "j" at the nesting level "2" is "1", and the final value of the control variable "ij" at the nesting level "1" is the value (number of rotations) "xy" obtained by multiplying the final value "y" of the control variable "j" before the change and the final value "x" of the control variable "i".

Meanwhile, the offset offset2 of the position from the top area of the two-dimensional array A(ij, t(k)) with the array size of ((x*y), z) may be obtained by the following equation (5) using the equation (1).

Offset2$(A(ij,t(k))) = \{(ij-1)+(t(k)-1)*(x*y)\}*L$     (5)

Then, the source program 21 of such a two-dimensional array A is illustrated in the lower part of FIG. 6B.

Such equation (5) matches the equation (4). Offset2(A(ij, t(k)))=Offset3(A(ij, 1, t(k))). That is, the offset of the position to be accessed from the top area of the two-dimensional array A(ij, t(k)) matches the offset of the position from the top area of the three-dimensional array A(ij, 1, t(k)).

That is, when the access size (defined size) of a certain array is equal to the number of loop rotations (x*y), a three-dimensional array may be regarded as loop access of a two-dimensional array. This means that the loop nests may be reduced by replacing an n-dimensional array A with an (n-1)-dimensional array A and integrating the loops. Since the (n-1)-dimensional array A has access obtained by reducing the array dimension of the n-dimensional array A by one, the source program 21 is enabled to reduce the loop nests by integrating the loops. By reducing the loop nests, the source program 21 is enabled to reduce branches in the multiple loop, increase the number of executions in the basic block, and increase the loop execution density. Additionally, the source program 21 is enabled to efficiently use the branch table to be used for branch prediction. The source program 21 is enabled to efficiently apply hardware mechanism (short loop mechanism), which temporarily stores an instruction sequence in an instruction buffer and directly retrieves the instruction from the instruction buffer to execute it by skipping instruction decoding.

Figure 6C:
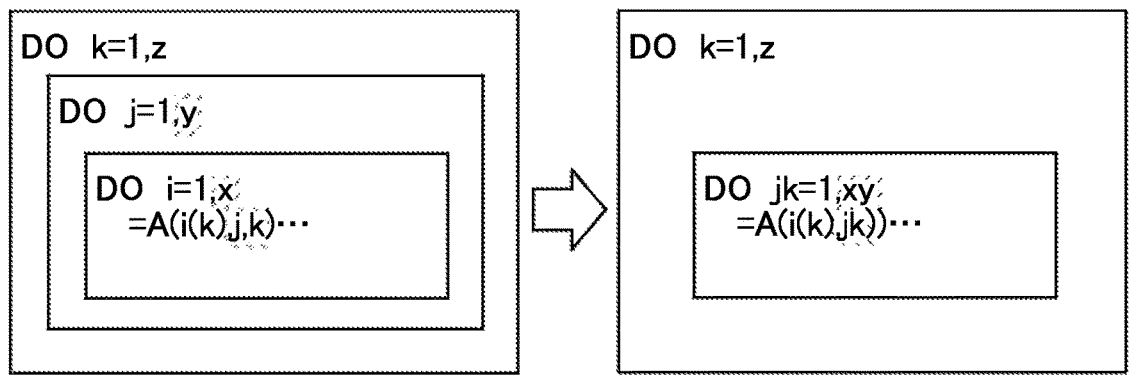
FIG. 6C is a diagram (3) illustrating the optimization according to the embodiment.

The three-dimensional array illustrated in the left figure in FIG. 6C may also be regarded as loop access of the two-dimensional array illustrated in the right figure in FIG.

6C. Here, the relative position of the array element of the subscript (i, j, k) from the top area of the three-dimensional array A with the array size (x, y, z) is assumed to be Offset3(A(i, j, k), d(x, y, z)). Similarly, the relative position of the array element of the subscript (i, j) from the top area of the two-dimensional array A with the array size (x, y) is assumed to be Offset2(A(i, j), d(x, y)).

Then, the offset Offset3(A(i, j, k), d(x, y, *)) of the position from the top area of the three-dimensional array A may be obtained as follows.

$$\text{Offset3}(A(i,j,k),d(x,y,*))=\{(i-1)+(j-1)*x+(k-1)*(x*y)\}*L$$

Furthermore, Offset3(A(ij, 1, k), d(x, y, *)) when the subscript of the subscript dimension "2" is set to "1" may be obtained as follows.

$$\text{Offset3}(A(ij,1,k),d(x,y,*))=\{(ij-1)+(k-1)*(x*y)\}*L$$

Since such Offset3(A(ij, 1, k), d(x, y, *)) has the access size of the two-dimensional array equal to the number of loop rotations (x*y), it matches Offset2(A(ij, k), d(x, y, *)).

Furthermore, Offset3(A(i, jk, 1), d(x, y, *)) when the subscript of the subscript dimension "3" is set to "1" may be obtained as follows. Offset3(A(i, jk, 1), d(x, y, *))={(i−1)+(jk−1)*(x*y)}*L Since such Offset3(A(i, jk, 1), d(x, y, *)) has the access size of the two-dimensional array equal to the number of loop rotations (x*y), it matches Offset2(A(i, jk), d(x, y, *)).

Therefore, even when the subscript of the subscript dimension "1" is set to a function i(k), the three-dimensional array A(i(k), j, k) may be regarded as loop access of the two-dimensional array A(i(k), jk) as illustrated in FIG. 6C. This is because the array access size (defined size) is equal to the number of loop rotations (x*y).

Figure 6D:
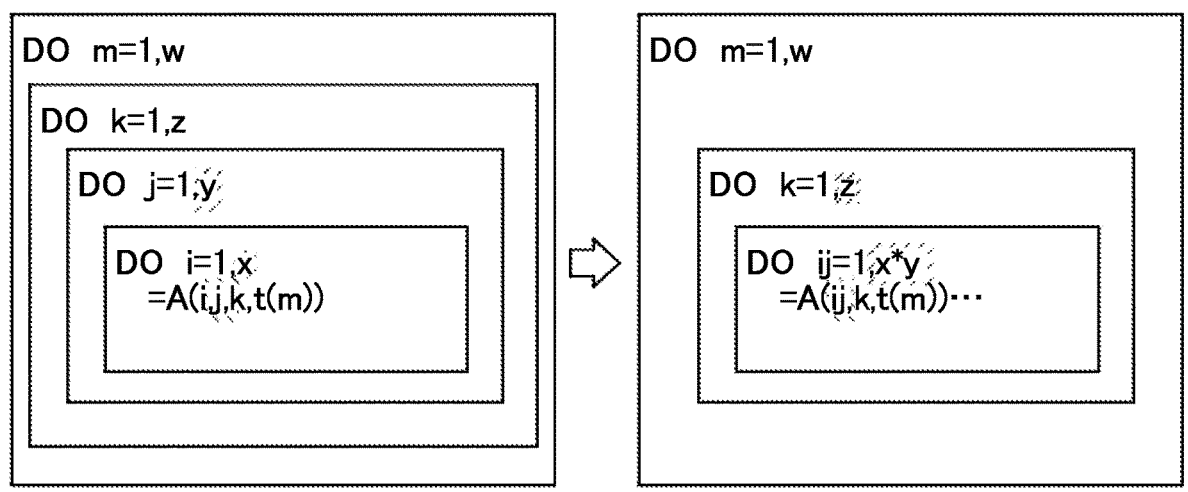
FIG. 6D is a diagram (4) illustrating the optimization according to the embodiment.

The four-dimensional array illustrated in the left figure in FIG. 6D may also be regarded as loop access of the three-dimensional array illustrated in the right figure in FIG. 6D. Here, the relative position of the array element of the subscript (i, j, k, m) from the top area of the four-dimensional array A with the array size (x, y, z, w) is assumed to be Offset4(A(i, j, k, m), d(x, y, z, w)). Then, the offset Offset4(A(i, j, k, m), d(x, y, z, *)) of the position from the top area of the four-dimensional array A may be obtained as follows.

$$\text{Offset4}(A(i,j,k,m),d(x,y,z,*))=\{(i-1)+(j-1)*x+(k-1)*(x*y)+(m-1)*(x*y*z)\}*L$$

Furthermore, Offset4(A(ij, 1, k, m), d(x, y, z, *)) when the subscript of the subscript dimension "2" is set to "1" may be obtained as follows.

$$\text{Offset4}(A(ij,1,k,m),d(x,y,z,*))=\{(ij-1)+(k-1)*(x*y)+(m-1)*(x*y*z)\}*L$$

Such Offset4(A(ij, 1, k, m), d(x, y, z, *)) matches Offset3 (A(ij, k, m), d(x*y, z,*)).

Therefore, even when the subscript of the subscript dimension "4" is set to a function "t(m)", the four-dimensional array A(i, j, k, t(m)) may be regarded as loop access of the three-dimensional array A(ij, k, t(m)) as illustrated in FIG. 6D. This is because the array access size (defined size) is equal to the number of loop rotations (x*y).

Similarly, when the number of loop rotations y*z matches the defined size for the adjacent subscripts j and k of the four-dimensional array A(i, j, k, m), a four-dimensional array A(i, jk, 1, m) may be regarded as a three-dimensional array A (i, jk, m) to reduce the loop nests from four loops to three loops. Similarly, a four-dimensional array A(i, j, km, 1) may be regarded as a three-dimensional array A(i, j, km) with the number of loop rotations x*y to reduce the loop nests from four loops to three loops. Similarly, a four-dimensional array A(ijk, 1, 1, m) may be regarded as a two-dimensional array A(ijk, m) with the number of loop rotations x*y*z to reduce the loop nests from four loops to two loops. Similarly, the four-dimensional array A(i, j, k, m) may be transformed into A(ij, 1, km, 1) to be regarded as a two-dimensional array A(ij, kj) with the number of loop rotations x*y, z*w so that the loop nests may be reduced from four loops to two loops.

Figure 7:
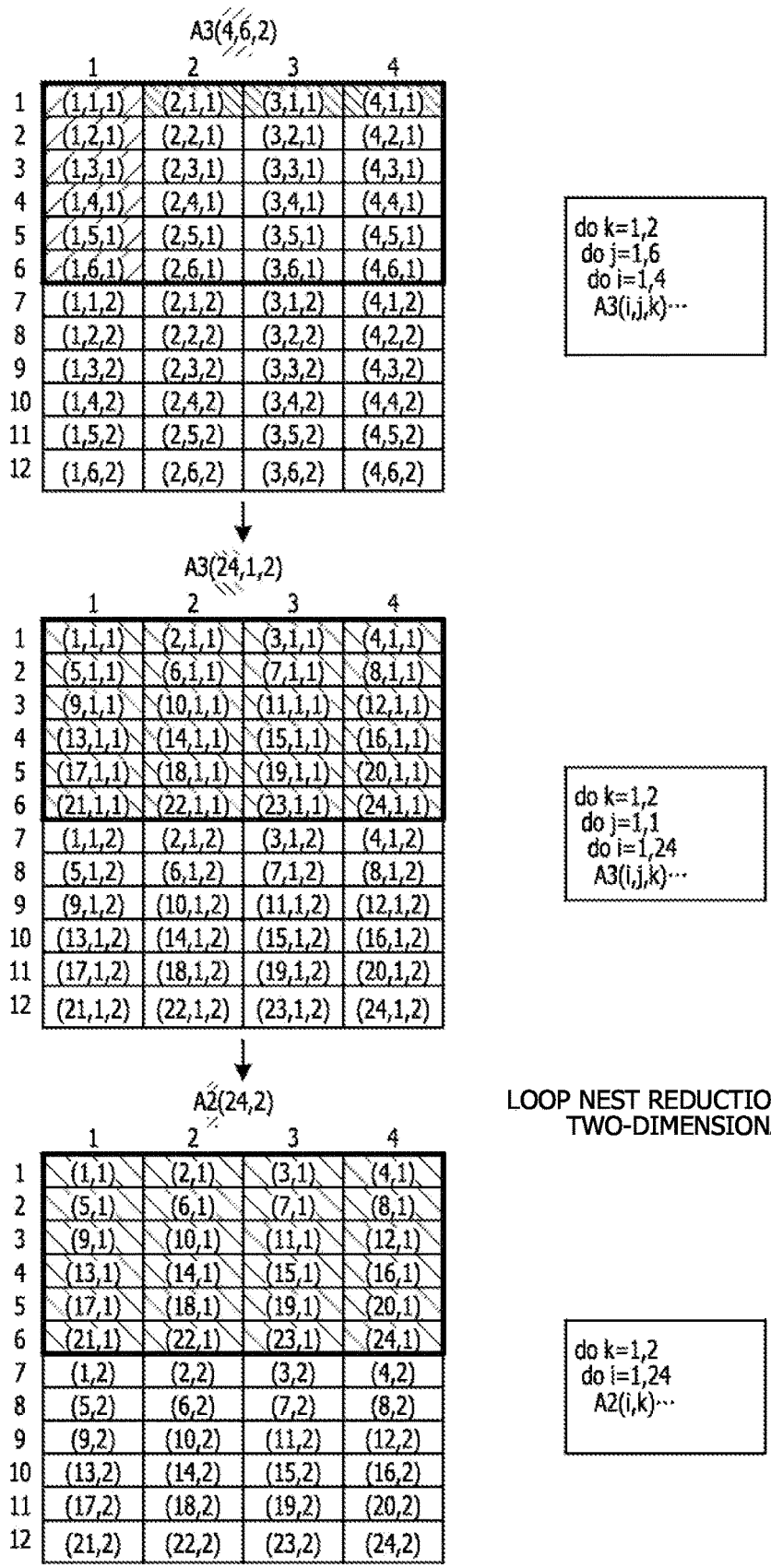
FIG. 7 is a diagram illustrating the optimization using array memory areas.

FIG. 7 is a diagram illustrating the optimization using array memory areas. Note that, it is assumed that FIG. 7 illustrates a case where the array size of the three-dimensional array is (4, 6, 2).

In the upper part of FIG. 7, a positional offset Offset3 (A3(i, j, k)) of a memory area in a three-dimensional array A3(i, j, k) with the array size (4, 6, 2) is illustrated. Elements corresponding to subscripts i of 1 to 4 are located in the array memory area of each row. Elements corresponding to subscripts j of 1 to 6 are located in the array memory area of each column. Additionally, elements corresponding to a subscript k of 1 are located in the array memory area of first to sixth rows, and elements corresponding to the subscript k of 2 are located in the array memory area of seventh to twelfth rows.

In the middle part of FIG. 7, a positional offset Offset3 (A3(i, 1, k)) of a memory area in a three-dimensional array A3(i, 1, k) with an array size (24, 1, 2) is illustrated. In the array memory area of the first to sixth rows, the elements corresponding to the subscript k of 1 and the subscript j of 1 are located in the address direction with the subscript i (1 to 24) changed. In the array memory area of the seventh to twelfth rows, the elements corresponding to the subscript k of 2 and the subscript j of 1 are located in the address direction with the subscript i (1 to 24) changed. That is, the offset of the position accessed from the top area of A3(i, j, k) with the array size (4, 6, 2) matches the offset of the position from the top area of A3(i, 1, k) with the array size (24, 1, 2). It is indicated that both arrays are accessed in ascending order from the top area of the array.

Meanwhile, in the lower part of FIG. 7, a positional offset Offset2(A2(i, k)) of a memory area in a two-dimensional array A2(i, k) with an array size (24, 2) is illustrated. In the array memory area of the first to sixth rows, the elements corresponding to the subscript k of 1 are located in the address direction with the subscript i (1 to 24) changed. In the array memory area of the seventh to twelfth rows, the elements corresponding to the subscript k of 2 are located in the address direction with the subscript i (1 to 24) changed.

Then, Offset2(A2(i, k)) matches Offset3(A3(i, 1, k)). For example, the offset of the position accessed from the top area of the two-dimensional array A2(i, k) matches the offset of the position from the top area of the three-dimensional array A3(i, 1, k). Both arrays are accessed in ascending order from the top area of the array.

For example, when the access size (defined size) of the array is equal to the number of loop rotations (6*4), the three-dimensional array may be regarded as loop access of the two-dimensional array. This means that the loop nests may be reduced by replacing the n-dimensional array A with the (n−1)-dimensional array A and integrating the loops. For example, since the (n−1)-dimensional array A has access obtained by reducing the array dimension of the n-dimensional array A by one, the source program 21 is enabled to reduce the loop nests by integrating the loops.

In this manner, it has been described that, in the optimization process according to the embodiment, the loop nests may be reduced by replacing the three-dimensional array A(i, j, k) with the two-dimensional array A(ij, k) and integrating the loops. Here, inside the compiler, with the subscript part for the loop integration treated as "1" (replaced with A(ij, 1, k)), the array definition information 24 of the same number of dimensions may be directly used without reducing the number of dimensions of the array. Therefore, hereinafter, an exemplary case of using the array definition information 24 of the same number of dimensions with the subscript of the dimension to be reduced being set to "1" will be described in the array dimension reduction.

Exemplary Optimization

FIG. 8A is a diagram (1) illustrating an example of the optimization according to the embodiment. The left figure in FIG. 8A illustrates the source program 21. It is assumed that the syntax analysis unit 11 analyzes loops written in the source program 21 and stores the analysis result in the loop management table 22 illustrated in FIG. 3. It is assumed that the syntax analysis unit 11 analyzes the array in the loops written in the source program 21 and stores the analysis result in the array syntax information 23 illustrated in FIG. 4 and the array definition information 24 illustrated in FIG. 5.

The array analysis unit 121 searches the nesting levels of the loop management table 22 from 1 to the final level. The array analysis unit 121 determines whether or not the control variable corresponding to the nesting level k in the loop management table 22 matches the subscript corresponding to the subscript dimension k of the target array of the array syntax information 23 (<1>). Furthermore, the array analysis unit 121 determines whether or not the initial value corresponding to the nesting level k is "1", the increment value is "1", and the final value matches the defined size corresponding to the subscript dimension k in the array definition information 24 in the loop management table 22 (<2>). The condition <2> determines whether or not the number of loop rotations at the nesting level k matches the array size of the subscript dimension k.

Here, with regard to <1>, when the nesting level is "1", while the control variable for the nesting level k (=1) is "x", the subscript of the subscript dimension k (=1) of the array a3 is "mod(x, 3)+1", which do not match with each other, whereby the condition is not satisfied.

With regard to <1>, when the nesting level is "2", the control variable for the nesting level k (=2) is "y", and the subscript of the subscript dimension k (=2) of the array a3 is "y", which match with each other, whereby the condition is satisfied. Furthermore, with regard to <2>, the initial value corresponding to the nesting level k (=2) is "1", the increment value is "1", and the final value "20" matches the defined size "20" corresponding to the subscript dimension k (=2) of the array definition information 24, whereby the condition is satisfied. The number of loop rotations matches the array definition (array access size).

Next, with regard to <1>, when the nesting level is "3", the control variable for the nesting level k (=3) is "z", and the subscript of the subscript dimension k (=3) of the array a3 is "z", which match with each other, whereby the condition is satisfied. Furthermore, with regard to <2>, the initial value corresponding to the nesting level k (=3) is "1", the increment value is "1", and the final value "30" matches the defined size "30" corresponding to the subscript dimension k (=3) of the array definition information 24, whereby the condition is satisfied. The number of loop rotations matches the array definition (array access size).

The array b3 has the same result as the array a3.

Since the conditions <1> and <2> are satisfied at the consecutive nesting levels k, the extraction unit 122 extracts the target arrays a3 and b3. The extraction unit 122 extracts the loops 2 and 3 at the consecutive nesting levels k as reducible loops.

Then, the integration unit 123 sets the smaller one "2" of the consecutive dimensions "2" and "3" as a replacement dimension, and replaces it with the variable "yz" obtained by combining the subscripts of the individual dimensions. Furthermore, the integration unit 123 replaces the subscript "z" of the dimension "3", which is not the replacement dimension, with a constant "1". Here, the arrays a3 and b3 are replaced from the following left expressions to right expressions.

$$a3(\mod(x,3)+1,y,z) \rightarrow a3(\mod(x,3)+1,yz,1).$$

$$b3(\mod(x,3)+1,y,z) \rightarrow b3(\mod(x,3)+1,yz,1).$$

Then, the integration unit 123 reduces the loop at the nesting level "2" corresponding to the smaller one "2" of the consecutive dimensions. Then, the integration unit 123 refers to the loop management table 22 to change the final value of the integrated loop to the number of rotations (20*30) obtained by multiplying the final values of the individual loops at the consecutive nesting levels. Then, the integration unit 123 changes the control variable of the integrated loop to the variable yz replaced in the array. Here, "do y=1, 20" is deleted. Then, "do z=1, 30" is changed to "do yz=1, 20*30".

As a result, the source program 21 illustrated in the left figure in FIG. 8A is changed to the program illustrated in the right figure in FIG. 8A.

The case of integrating two loops into one loop has been described with reference to FIG. 8A. However, it is not limited to the case of integrating two loops into one loop, and may be a case of integrating three or more loops into one loop. In view of the above, the case of integrating three or more loops into one loop will be described with reference to FIG. 8B.

FIG. 8B is a diagram (2) illustrating an example of the optimization according to the embodiment. Note that the defined size of each of the array names a4 and b4 illustrated in FIG. 8B is assumed to be (10, 20, 30, 40). The left figure in FIG. 8B illustrates the source program 21. With regard to <1>, when the nesting level is "1", while the control variable for the nesting level k (=1) is "x", the subscript of the subscript dimension k (=1) of the array a4 is "mod(x, 3)+1", which do not match with each other, whereby the condition is not satisfied.

With regard to <1>, when the nesting level is "2", the control variable for the nesting level k (=2) is "y", and the subscript of the subscript dimension k (=2) of the array a4 is "y", which match with each other, whereby the condition is satisfied. Furthermore, with regard to <2>, the initial value corresponding to the nesting level k (=2) is "1", the increment value is "1", and the final value "20" matches the defined size "20" corresponding to the subscript dimension k (=2) of the array definition information 24, whereby the condition is satisfied. The number of loop rotations matches the array definition (array access size).

Next, with regard to <1>, when the nesting level is "3", the control variable for the nesting level k (=3) is "z", and the subscript of the subscript dimension k (=3) of the array a4 is "z", which match with each other, whereby the condition is satisfied. Furthermore, with regard to <2>, the initial value corresponding to the nesting level k (=3) is "1", the increment value is "1", and the final value "30" matches the defined size "30" corresponding to the subscript dimension k (=3) of the array definition information 24, whereby the condition is satisfied. The number of loop rotations matches the array definition (array access size).

Next, with regard to <1>, when the nesting level is "4", the control variable for the nesting level k (=4) is "w", and the subscript of the subscript dimension k (=4) of the array a4 is "w", which match with each other, whereby the condition is satisfied. Furthermore, with regard to <2>, the initial value corresponding to the nesting level k (=4) is "1", the increment value is "1", and the final value "40" matches the defined size "40" corresponding to the subscript dimension k (=4) of the array definition information 24, whereby the condition is satisfied. The number of loop rotations matches the array definition (array access size).

The array b4 has the same result as the array a4.

Then, since the conditions <1> and <2> are satisfied at the consecutive nesting levels k, the extraction unit 122 extracts the target arrays a4 and b4. The extraction unit 122 extracts the loops 2, 3, and 4 at the consecutive nesting levels k as reducible loops.

Then, the integration unit 123 sets the smaller one "2" of the consecutive dimensions "2", "3", and "4" as a replacement dimension, and replaces it with the variable "yzw" obtained by combining the subscripts of the individual dimensions. Furthermore, the integration unit 123 replaces each of the subscripts "z" and "w" of the dimensions "3" and "4", which is not the replacement dimension, with a constant "1". Here, the arrays a4 and b4 are replaced from the following left expressions to right expressions.

$$a4(\mod(x,3)+1, y, z, w) \rightarrow a4(\mod(x,3)+1, yzw, 1, 1).$$

$$b4(\mod(x,3)+1, y, z, w) \rightarrow a4(\mod(x,3)+1, yzw, 1, 1).$$

Then, the integration unit 123 reduces the loops at the nesting levels "2" and "3" corresponding to the smaller ones "2" and "3" of the consecutive dimensions. Then, the integration unit 123 refers to the loop management table 22 to change the final value of the integrated loop to the number of rotations (20*30*40) obtained by multiplying the final values of the individual loops at the consecutive nesting levels. Then, the integration unit 123 changes the control variable of the integrated loop to the variable yzw replaced in the array. Here, "do y=1, 20" and "do z=1, 30" are deleted.

Then, "do w=1, 40" is changed to "do yzw=1, 20*30*40".

The case of integrating two loops into one loop has been described with reference to FIG. 8A. The case of integrating three or more loops into one loop has been described with reference to FIG. 8B. However, it is not limited to the case of integrating three or more loops into one loop, and may be a case where a plurality of loop groups to be integrated are included in the multiple loop. In view of the above, the case where a plurality of loop groups to be integrated are included in the multiple loop will be described with reference to FIG. 8C.

FIG. 8C is a diagram (3) illustrating an example of the optimization according to the embodiment. Note that the defined size of each of the array names a5 and b5 illustrated in FIG. 8C is assumed to be (10, 20, 30, 40, 50). The left figure in FIG. 8C illustrates the source program 21.

With regard to <1>, when the nesting level is "3", while the control variable for the nesting level k (=3) is "z", the subscript of the subscript dimension k (=3) of the array a5 is "mod(z, DV1)+1", which do not match with each other, whereby the condition is not satisfied.

With regard to <1>, when the nesting level is "1", the control variable for the nesting level k (=1) is "x", and the subscript of the subscript dimension k (=1) of the array a5 is "x", which match with each other, whereby the condition is satisfied. Furthermore, with regard to <2>, the initial value corresponding to the nesting level k (=1) is "1", the increment value is "1", and the final value "10" matches the defined size "10" corresponding to the subscript dimension k (=1) of the array definition information 24, whereby the condition is satisfied. The number of loop rotations matches the array definition (array access size).

Furthermore, with regard to <1>, when the nesting level is "2", the control variable for the nesting level k (=2) is "y", and the subscript of the subscript dimension k (=2) of the array a5 is "y", which match with each other, whereby the condition is satisfied. Furthermore, with regard to <2>, the initial value corresponding to the nesting level k (=2) is "1", the increment value is "1", and the final value "20" matches the defined size "20" corresponding to the subscript dimension k (=2) of the array definition information 24, whereby the condition is satisfied. The number of loop rotations matches the array definition (array access size).

Next, with regard to <1>, when the nesting level is 4, the control variable for the nesting level k (=4) is "w", and the subscript of the subscript dimension k (=4) of the array a5 is "w", which match with each other, whereby the condition is satisfied. Furthermore, with regard to <2>, the initial value corresponding to the nesting level k (=4) is "1", the increment value is "1", and the final value "40" matches the defined size "40" corresponding to the subscript dimension k (=4) of the array definition information 24, whereby the condition is satisfied. The number of loop rotations matches the array definition (array access size).

Furthermore, with regard to <1>, when the nesting level is "5", the control variable for the nesting level k (=5) is "a", and the subscript of the subscript dimension k (=5) of the array a5 is "a", which match with each other, whereby the condition is satisfied. Furthermore, with regard to <2>, the initial value corresponding to the nesting level k (=5) is "1", the increment value is "1", and the final value "50" matches the defined size "50" corresponding to the subscript dimension k (=5) of the array definition information 24, whereby the condition is satisfied. The number of loop rotations matches the array definition (array access size).

The array b5 has the same result as the array a5.

Since the conditions <1> and <2> are satisfied at the consecutive nesting levels "1" and "2" and "4" and "5", the extraction unit 122 extracts the target arrays a5 and b5. The extraction unit 122 extracts the loops "1" and "2" and "4" and "5" at the consecutive nesting levels k as reducible loops.

Then, the integration unit 123 sets the smaller one "1" of the consecutive dimensions "1" and "2" as a replacement dimension, and replaces it with the variable "xy" obtained by combining the subscripts of the individual dimensions. Furthermore, the integration unit 123 replaces the subscript "y" of the dimension "2", which is not the replacement dimension, with a constant "1". Furthermore, the integration unit 123 sets the smaller one "4" of the consecutive dimensions "4" and "5" as a replacement dimension, and replaces it with the variable "wa" obtained by combining the subscripts of the individual dimensions. Furthermore, the integration unit 123 replaces the subscript "a" of the dimension "5", which is not the replacement dimension, with a constant "1". Here, the arrays a5 and b5 are replaced from the following left expressions to right expressions.

$$a5(x,y,\mathrm{mod}(z,DV1)+1,w,a) \rightarrow a5(xy,1,\mathrm{mod}(z,DV1)+1, wa,1).$$

$$b5(x,y,\mathrm{mod}(z,DV1)+1,w,a) \rightarrow b5(xy,1,\mathrm{mod}(z,DV1)+1, wa,1).$$

Then, the integration unit 123 reduces the loop at the nesting level "1" corresponding to the smaller one "1" of the consecutive dimensions. Then, the integration unit 123 refers to the loop management table 22 to change the final value of the integrated loop to the number of rotations (10*20) obtained by multiplying the final values of the individual loops at the consecutive nesting levels. Then, the integration unit 123 changes the control variable of the integrated loop to the variable "xy" replaced in the array. Furthermore, the integration unit 123 reduces the loop at the nesting level "4" corresponding to the smaller one "4" of another consecutive dimensions. Then, the integration unit 123 refers to the loop management table 22 to change the final value of the integrated loop to the number of rotations (40*50) obtained by multiplying the final values of the individual loops at the consecutive nesting levels. Then, the integration unit 123 changes the control variable of the integrated loop to the variable "wa" replaced in the array. Here, "do x=1, 10" and "do w=1, 40" are deleted. Then, "do y=1, 20" is changed to "do xy=1, 10*20". In addition, "do a=1, 50" is changed to "do wa=1, 40*50".

Another Exemplary Optimization

Figure 9:
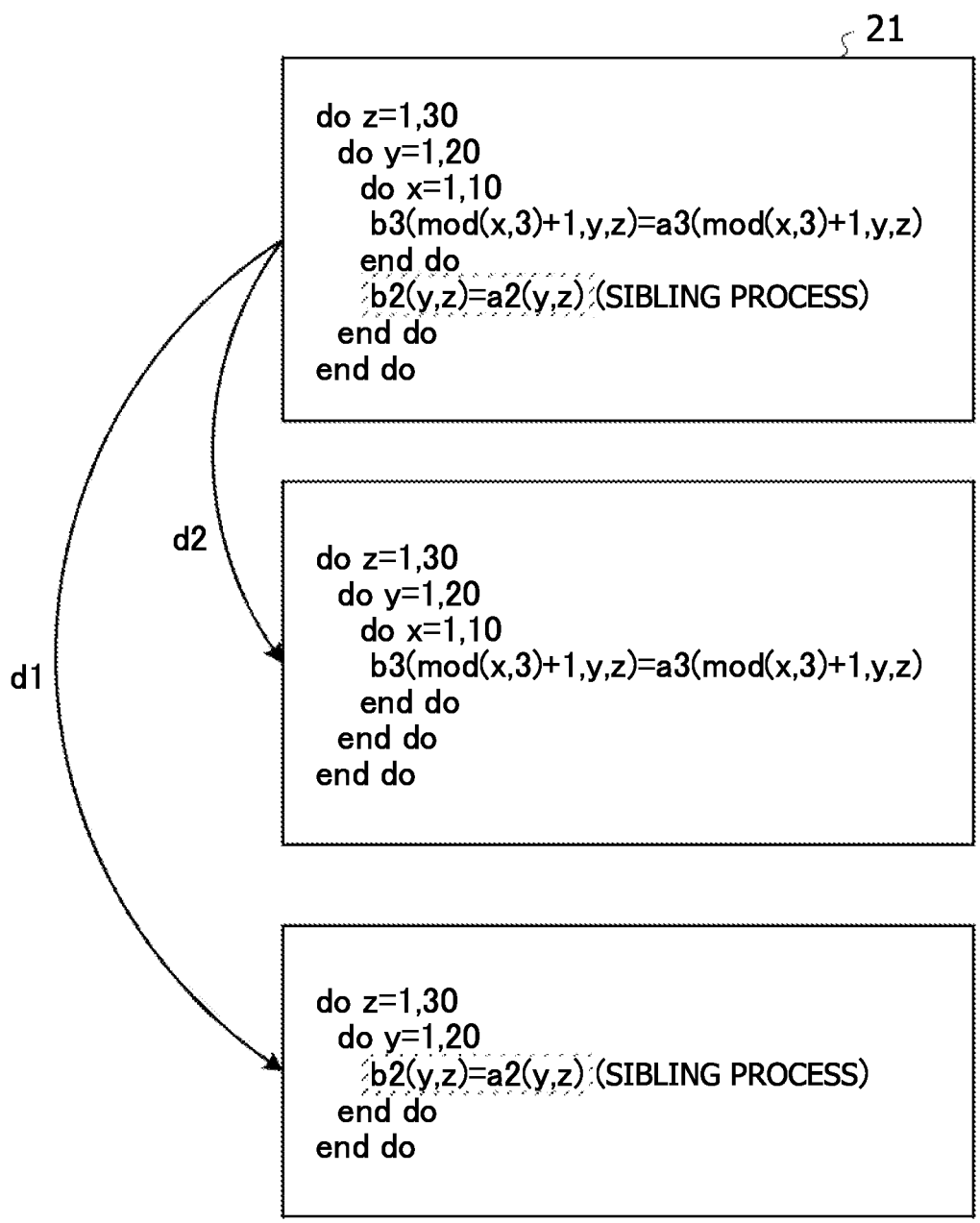
FIG. 9 is a diagram illustrating another exemplary optimization according to the embodiment.

FIG. 9 is a diagram illustrating another example of the optimization according to the embodiment. The source program 21 illustrated in FIG. 9 includes a sibling process in a loop at the nesting level of "2". The sibling flag corresponding to the nesting level "2" in the loop management table 22 is set to "1".

The array analysis unit 121 refers to the loop management table 22, and sets the sibling process as a separate process since the sibling flag is set at the nesting level "2" of the multiple loop. For example, the array analysis unit 121 performs loop division of the sibling process as indicated by a reference sign d1. Then, the array analysis unit 121 sets a multiple loop configuration not including the sibling process as indicated by a reference sign d2, and then analyzes the array. Furthermore, the array analysis unit 121 analyzes the array of the multiple loop configuration of the sibling process having been subject to the loop division. As a result, the array analysis unit 121 is enabled to simplify the optimization by setting the sibling process as a separate process.

Optimization Process Flowchart

Figure 10A:
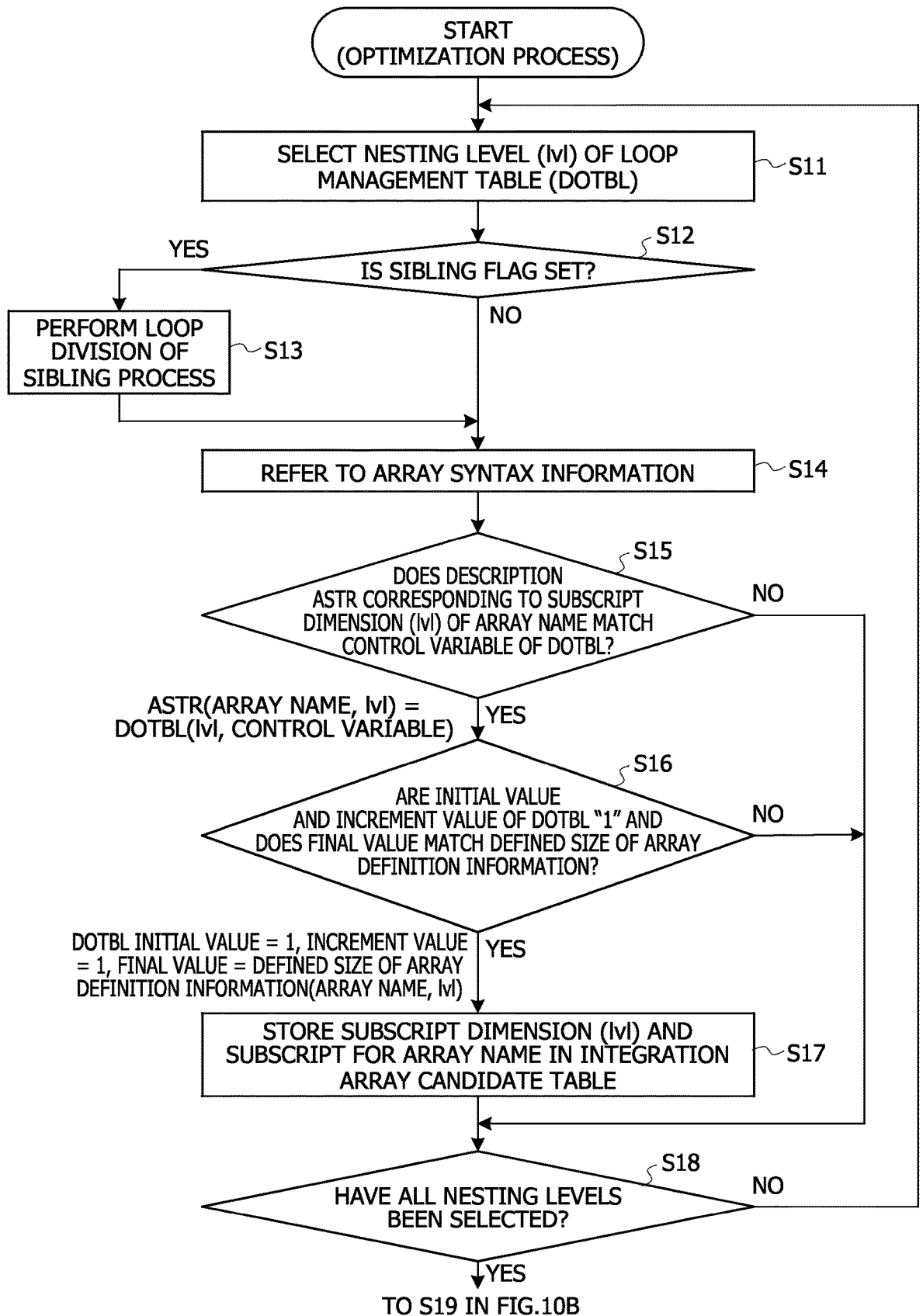
FIGS. 10A and 10B are flowcharts of the optimization process according to the embodiment.
Figure 10B:
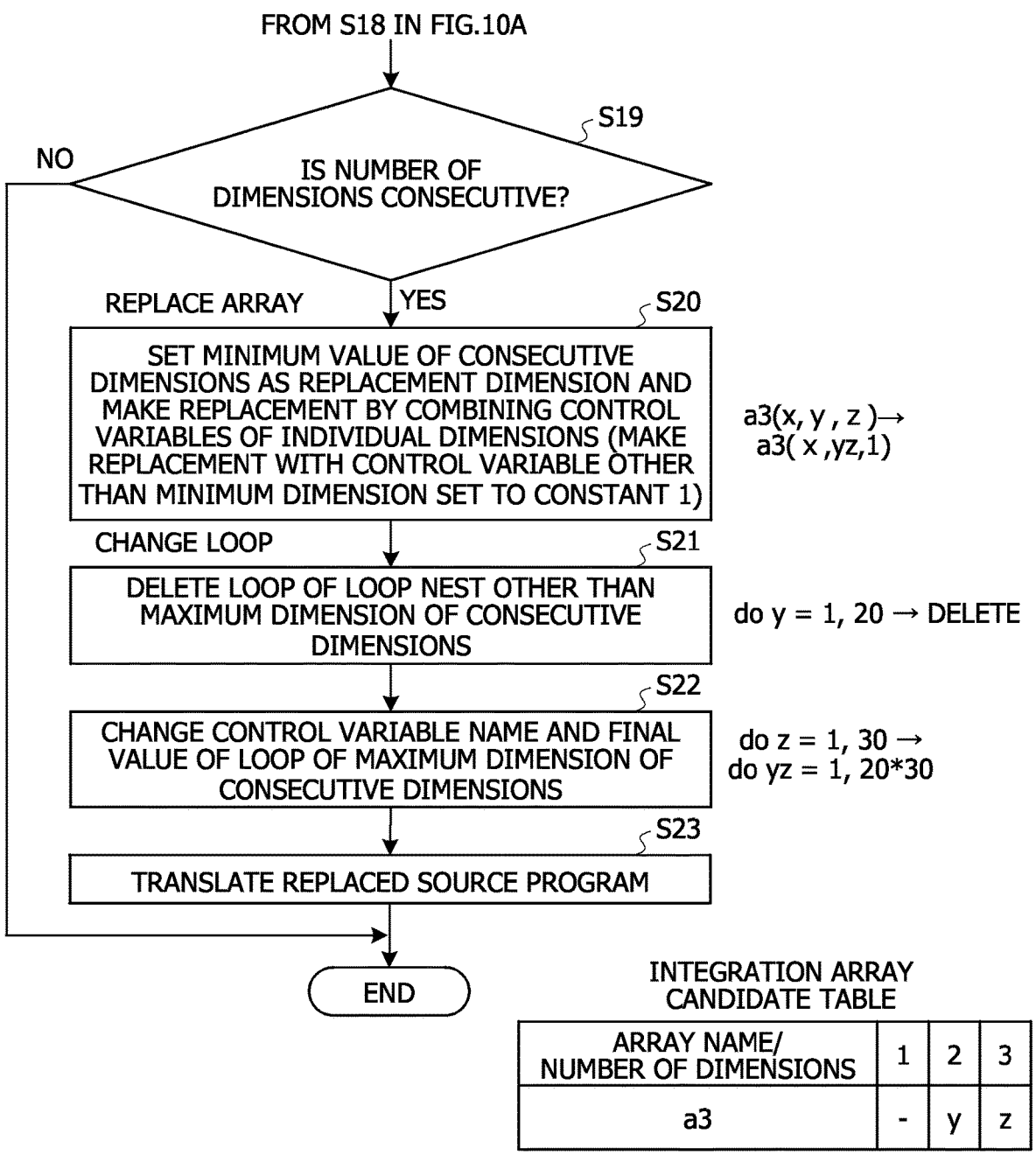

FIGS. 10A and 10B are flowcharts of the optimization process according to the embodiment. Note that the syntax analysis unit 11 is assumed to have generated the loop management table 22, the array syntax information 23, and the array definition information 24 for the source program 21.

As illustrated in FIGS. 10A and 10B, the array analysis unit 121 selects a nesting level (lvl) of the loop management table 22 (abbreviated as DOTBL) (step S11).

Then, the array analysis unit 121 determines whether or not a sibling flag corresponding to the nesting level is set (step S12). If it is determined that the sibling flag is set (Yes in step S12), the array analysis unit 121 performs loop division of the sibling process (step S13). Then, the array analysis unit 121 proceeds to step S14 to perform the optimization process on each of the sibling process and the multiple loop configuration not including the sibling process.

On the other hand, if it is determined that the sibling flag is not set (No in step S12), the array analysis unit 121 proceeds to step S14.

In step S14, the array analysis unit 121 refers to the array syntax information 23 (step S14). The array analysis unit 121 determines whether or not description ASTR corresponding to the subscript dimension (lvl) of the array name matches the control variable of DOTBL (step S15). For example, the array analysis unit 121 determines whether or not the subscript corresponding to the subscript dimension |vl| of the target array of the array syntax information 23 matches the control variable corresponding to the same nesting level |vl| as the subscript dimension in the loop management table 22 (condition <1>).

If it is determined that the description ASTR corresponding to the subscript dimension (lvl) of the array name does not match the control variable in DOTBL (No in step S15), the array analysis unit 121 proceeds to step S18 to select the next nesting level (lvl).

On the other hand, if it is determined that the description ASTR corresponding to the subscript dimension (lvl) of the array name matches the control variable in DOTBL (Yes in step S15), the array analysis unit 121 performs the following process. The array analysis unit 121 determines whether or not the initial value of DOTBL is "1", the increment value is "1", and the final value matches the defined size of the array definition information 24 (condition <2>) (step S16). For example, the array analysis unit 121 determines whether or not the number of loop rotations at the nesting level (lvl) matches the defined array size of the subscript dimension (lvl).

If it is determined that the initial value of DOTBL is not "1", the increment value is not "1", or the final value does not match the defined size of the array definition information 24 (No in step S16), the array analysis unit 121 proceeds to step S18 to select the next nesting level (lvl).

On the other hand, if it is determined that the initial value of DOTBL is "1", the increment value is "1", and the final value matches the defined size of the array definition information 24 (Yes in step S16), the array analysis unit 121 stores, for the array name, the subscript and the subscript dimension (lvl) corresponding to the nesting level in an integration array candidate table (step S17). Then, the array analysis unit 121 proceeds to step S18. Note that the integration array candidate table indicates a table to be used to integrate loops. The integration array candidate table stores, for each array name, a subscript for each subscript dimension corresponding to a nesting level of a loop that is a candidate for integration.

In step S18, the array analysis unit 121 determines whether or not all nesting levels (lvl) have been selected (step S18). If it is determined that some of the nesting levels (lvl) have not been selected (No in step S18), the array analysis unit 121 proceeds to step S11 to select the next nesting level.

On the other hand, if it is determined that all the nesting levels (lvl) have been selected (Yes in step S18), the extraction unit 122 refers to the integration array candidate table to determine whether or not the number of dimensions is consecutive (step S19). If it is determined that the number of dimensions is not consecutive (No in step S19), the loops may not be integrated, and the extraction unit 122 terminates the optimization process.

If it is determined that the number of dimensions is consecutive (Yes in step S19), the extraction unit 122 extracts the loops at the nesting levels corresponding to the consecutive numbers of dimensions as reduction targets. Then, the integration unit 123 sets the minimum value of the consecutive dimensions as a replacement dimension, and replaces the subscript of the replacement dimension with the subscript obtained by combining the subscripts (control variables) of the individual dimensions. Then, the integration unit 123 replaces the subscripts (control variables) other than the subscript of the minimum dimension with the constant "1" (step S20). For example, the integration array candidate table stores, for the array name a3, "y" as the subscript (control variable) corresponding to the number of dimensions "2" and "z" as the subscript (control variable) corresponding to the number of dimensions "3". Then, the integration unit 123 replaces the array a3(x, y, z) with the array a3(x, yz, 1).

Then, the integration unit 123 deletes loops of the loop nest corresponding to dimensions other than the maximum dimension of the consecutive dimensions (step S21). Then, the integration unit 123 changes the control variable name and the final value of the loop of the maximum dimension among the consecutive dimensions (step S22). For example, the consecutive dimensions are "2" and "3". The loop nest corresponding to the dimension "2" is "2", and the control variable of the loop of the loop nest "2" is "y". The loop nest corresponding to the dimension "3" is "3", and the control variable of the loop of the loop nest "3" is "z". Then, the integration unit 123 deletes "do y=1, 20", for example. Then, the integration unit 123 changes "do z=1, 30" to "do yz=1, 20*30".

Then, the code generation unit 13 translates the replaced source program 21 (step S23). For example, the code generation unit 13 converts the replaced source program 21 into intermediate code. Then, the code generation unit 13 converts the intermediate code into a machine language program. Then, the code generation unit 13 terminates the optimization process.

As a result, the information processing device 1 is enabled to reduce branch instructions in the multiple loop by reducing loop nests, and is enabled to efficiently use a branch table to be used for branch prediction. Furthermore, the information processing device 1 is enabled to increase the number of executions per code in the basic block by reducing the loop nests, and is enabled to increase the loop execution density (number of executions/code size). Additionally, the information processing device 1 is enabled to improve application efficiency of a hardware mechanism (short loop mechanism), which temporarily stores an instruction sequence in an instruction buffer and directly retrieves the instruction from the instruction buffer to execute it by skipping instruction decoding.

Note that, in the embodiment, the array analysis unit 121 extracts loops to be reduced using the array size of consecutive subscripts in the n-dimensional array (n≥3) in the innermost loop and the number of rotations of the control variables corresponding to the consecutive subscripts in the multiple loop for the source program 21. Then, the array analysis unit 121 reduces the loop nest including the extracted loop. However, the array analysis unit 121 may further extract a loop to be reduced that is costly and effective for the compiler to reduce loop nest based on profile information. The profile information referred to here is information in which a loop length, a loop count, and an array access count are associated with each other for each loop. The loop length (L) refers to a code length of a code in a relevant loop. The loop count (M) refers to the number of loop rotations from the initial value to the final value of the relevant loop. The array access count (D) refers to the number of times the array is accessed in the relevant loop in one rotation. The profile information is information output when an object obtained as a result of translating the source program 21 is executed.

For example, when the loop length (L) is too long, instruction decoding and instruction fetching may not be omitted, whereby the cost of the instruction decoding and the instruction fetching of the program may be reduced as it becomes smaller than a certain threshold. The loop execution density may be increased as the array access count (D) and the loop count (M) of the array in a loop increase. Accordingly, performance improvement may be expected when M is large, L is large, and D is large. In view of the above, evaluation values (weight coefficients) are to be prepared in advance in such a manner that the effect increases as M, L, and D increase. Then, the array analysis unit 121 obtains the loop length (L), the array access count (D), and the loop count (M) for each loop i from the profile information, and calculates a value $(L(i)*l(i)+M(i)*m(i)+D(i)*d(i))$ obtained by multiplying those values by the weight coefficients corresponding thereto and adding them. Note that $l(i)$, $m(i)$, and $d(i)$ are the weight coefficients of the loop length, the array access count, and the loop count of the loop i, respectively. Then, the array analysis unit 121 may compare the calculated value for each loop with a predetermined threshold to extract candidates for a loop to be reduced. Then, the array analysis unit 121 may extract the loop to be reduced to reduce the loop nests using the candidates for a loop to be reduced extracted through the optimization process according to the embodiment and the candidates for a loop to be reduced extracted by referring to the profile information.

The evaluation function is not limited to $(L(i)*l(i)+M(i)*m(i)+D(i)*d(i))$. Furthermore, for the evaluation function, attributes other than M, L, and D may be added or may be combined. Furthermore, the predetermined threshold may be a logical value or an actually measured value (empirical value) obtained by a processor, and is not limited.

In the embodiment, it has been described that the array analysis unit 121 extracts the loop to be reduced to reduce the loop nests using the array size of consecutive subscripts in the n-dimensional array (n≥3) in the innermost loop and the number of rotations of the control variables corresponding to the consecutive subscripts in the loop for the source program 21. However, not limited to this, the array analysis unit 121 may obtain loops designated by a user to reduce the loop nests. For example, the user explicitly designates loops to be reduced in the source program 21 with Object Constraint Language (OCL) statements. Then, the array analysis unit 121 may obtain the loops designated by the OCL statements from the source program 21 to reduce the loop nests.

The case where the final value of each loop in the loop management table 22 is a constant has been described in the embodiment. However, the number of rotations may be a variable instead of a constant as long as the array analysis unit 121 is enabled to determine whether or not the final value storing the number of rotations is the same as the defined array size.

The case where the information processing device 1 internally replaces the source program 21 with another source program and expands the object from the intermediate language to the machine language has been described in the embodiment above. However, the information processing device 1 may expand the source program 21 into an intermediate language, carry out array replacement and loop integration at the intermediate language level, and then expand the object into a machine language.

The case where the defined array size is a fixed size determined at the time of translation has been described in the embodiment above. However, the defined array size may be a defined array size dynamically obtained at run-time. For example, it is sufficient if the array analysis unit 121 is enabled to determine whether or not the final value storing the number of rotations is the same as the defined array size.

Effects of Embodiment

According to the embodiment described above, in the source code including a multiple loop that is a loop with a hierarchical structure in which loops are nested, the information processing device 1 determines, for the n-dimensional array (n≥3) included in the instruction code in the innermost loop, whether or not array sizes of a first argument and a second argument match the numbers of rotations of a first index corresponding to the first argument and a second index corresponding to the second argument in the loop, respectively. When each of them matches, the information processing device 1 replaces the first argument and the second argument of the n-dimensional array included in the instruction code with a third argument to change the array to an (n−1)-dimensional array if the initial value of each of the first index and the second index is 1 and the increment value of the first index and the second index is 1. Then, the information processing device 1 integrates the loop using the first index and the loop using the second index. According to such a configuration, the information processing device 1 is enabled to reduce the loop nests by integrating the loops. As a result, the information processing device 1 is enabled to reduce branch instructions in the loop, and is enabled to efficiently use the branch table that may be used for branch prediction. Furthermore, the information processing device 1 is enabled to increase the number of executions per code in the basic block by reducing the loop nests, and is enabled to increase loop execution density.

According to the embodiment described above, the information processing device 1 further changes the n-dimensional array to the (n−1)-dimensional array if the variable indicating the first argument matches the control variable of the first index and the variable of the second argument matches the control variable of the second index. According to such a configuration, when the variable indicating the argument of the array at the same level matches the control variable of the loop index, the memory area allocated from the array size is consecutively accessed so that the information processing device 1 is enabled to reduce the loop nests. On the other hand, when the variable indicating the argument of the array at the same level does not match the control variable of the loop index, the access is made discontinuous so that the information processing device 1 is not enabled to reduce the loop nests.

According to the embodiment described above, the information processing device 1 further changes the n-dimensional array into the (n−1)-dimensional array when the first argument and the second argument are adjacent to each other. According to such a configuration, the information processing device 1 is enabled to reduce the array dimensions. As a result, the information processing device 1 is enabled to reduce the loop corresponding to the reduced argument.

According to the embodiment described above, the information processing device 1 deletes the loop using the first index corresponding to the first argument, and changes the final value of the second index corresponding to a third argument. According to such a configuration, the information processing device 1 is enabled to reduce the loop nests.

According to the embodiment described above, the information processing device 1 obtains candidates for loops to be integrated using the profile information including the code length of a code in each loop, the number of loop rotations in each loop, and the number of times the n-dimensional array is accessed in each loop in one rotation, which is obtained when the source code is executed, and determines the loops to be integrated from the obtained candidates. According to such a configuration, the information processing device 1 is further enabled to optimize the source code compilation.

According to the embodiment described above, the information processing device 1 determines the loops to be integrated based on the designation made by the user. According to such a configuration, the information processing device 1 is enabled to flexibly optimize the source code compilation.

Others

Note that each component of the information processing device 1 is not necessarily physically configured as illustrated in the drawings. For example, specific aspects of separation and integration of the information processing device 1 are not limited to the illustrated ones, and all or a part thereof may be functionally or physically separated or integrated in any unit depending on various loads, use states, and the like. For example, the array analysis unit 121 may be separated into a determination unit that determines whether the condition <1> is satisfied and a determination unit that determines whether the condition <2> is satisfied. Meanwhile, the array analysis unit 121 and the extraction unit 122 may be integrated as one unit. Furthermore, the storage unit 20 may be connected through a network as an external device of the information processing device 1.

Figure 11:
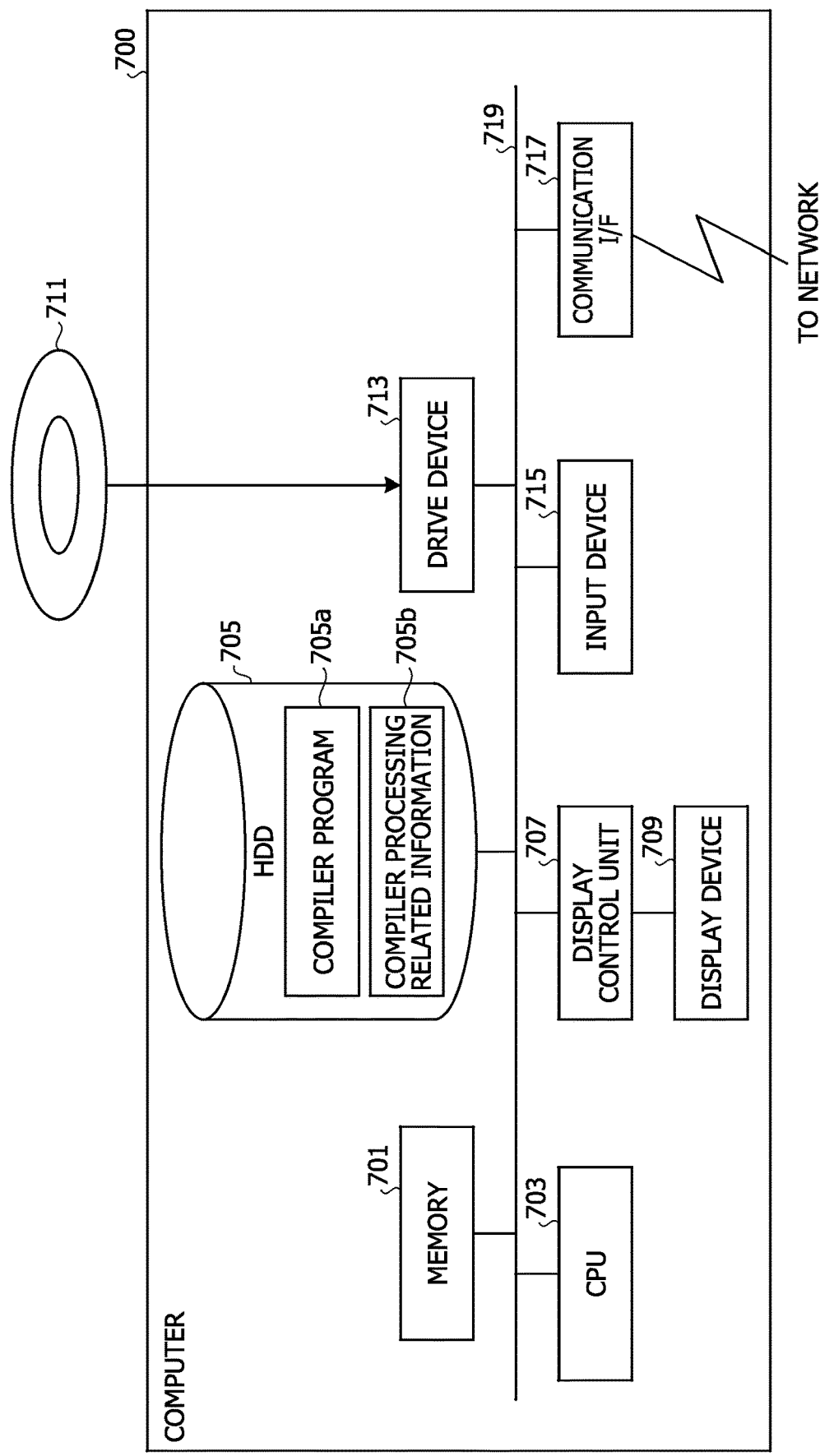
FIG. 11 is a diagram illustrating an exemplary computer that executes a compiler program.
Figure 12:
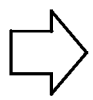
FIG. 12 is a diagram illustrating loop unification of a three-dimensional array.

Various types of processing described in the embodiment above may be implemented by a computer such as a personal computer or a workstation executing programs prepared in advance. Thus, in the following descriptions, an exemplary computer that executes a compiler program for implementing functions similar to those of the information processing device 1 illustrated in FIG. 1 will be described. FIG. 11 is a diagram illustrating an exemplary computer that executes the compiler program.

As illustrated in FIG. 11, a computer 700 includes a central processing unit (CPU) 703 that executes various types of arithmetic processing, an input device 715 that receives data input from the user, and a display control unit 707 that controls a display device 709. Furthermore, the computer 700 includes a drive device 713 that reads a program and the like from a storage medium, and a communication control unit 717 that exchanges data with another computer via a network. Furthermore, the computer 700 includes a memory 701 that temporarily stores various types of information, and a hard disk drive (HDD) 705. Additionally, the memory 701, the CPU 703, the HDD 705, the display control unit 707, the drive device 713, the input device 715, and the communication control unit 717 are coupled to each other via a bus 719.

The drive device 713 is, for example, a device for a removable disk 711. The HDD 705 stores a compiler program 705a and compiler processing related information 705b.

The CPU 703 reads the compiler program 705a, loads it into the memory 701, and executes it as a process. Such a process corresponds to the respective functional units of the information processing device 1. The compiler processing related information 705b corresponds to the loop management table 22, the array syntax information 23, the array definition information 24, and the like. Then, for example, the removable disk 711 stores each piece of information such as the compiler program 705a.

Note that the compiler program 705a may not necessarily be stored in the HDD 705 from the beginning. For example, the program may be stored in a "portable physical medium" to be inserted in the computer 700, such as a flexible disk (FD), a compact disc read only memory (CD-ROM), a digital versatile disc (DVD), a magneto-optical disk, an integrated circuit (IC) card, or the like. Then, the computer 700 may read the compiler program 705a from those media to execute it.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a process, the process comprising:
    determining, for an n-dimensional array (n≥3) included in an instruction code in an innermost loop of a multiple loop included in a source code, whether array sizes of a first argument and a second argument match numbers of rotations of a first index that corresponds to the first argument and a second index that corresponds to the second argument in the multiple loop, respectively, the multiple loop being a loop with a hierarchical structure in which loops are nested;
    when the array sizes match the numbers of rotations, respectively, and when an initial value of each of the first index and the second index is 1 and an increment value of each of the first index and the second index is 1, replacing the first argument and the second argument of the n-dimensional array included in the instruction code with a third argument and changing the n-dimensional array to an (n−1)-dimensional array; and
    integrating a first loop that uses the first index and a second loop that uses the second index.

2. The non-transitory computer-readable recording medium according to claim 1, the process further comprising:
    changing the n-dimensional array to the (n−1)-dimensional array when a variable that indicates the first argument matches a control variable of the first index and a variable that indicates the second argument matches a control variable of the second index.

3. The non-transitory computer-readable recording medium according to claim 2, the process further comprising:
    changing the n-dimensional array to the (n−1)-dimensional array when the first argument and the second argument are adjacent to each other.

4. The non-transitory computer-readable recording medium according to claim 1, the process further comprising:
    integrating the first loop and the second loop by deleting the first loop and by changing a final value of the second index that corresponds to a third argument.

5. The non-transitory computer-readable recording medium according to claim 1, the process further comprising:
    obtaining candidates for loops to be integrated by using profile information that includes a code length of a code in each loop, a number of loop rotations of each loop, and a number of times the n-dimensional array is accessed in each loop in one rotation, the profile information being obtained when the source code is executed; and
    determining the first loop and the second loop from the obtained candidates.

6. The non-transitory computer-readable recording medium according to claim 1, the process further comprising:
    determining the first loop and the second loop based on designation made by a user.

7. An information processing device, comprising:
    a memory; and
    a processor coupled to the memory and the processor configured to:
    determine, for an n-dimensional array (n≥3) included in an instruction code in an innermost loop of a multiple loop included in a source code, whether array sizes of a first argument and a second argument match numbers of rotations of a first index that corresponds to the first argument and a second index that corresponds to the second argument in the multiple loop, respectively, the multiple loop being a loop with a hierarchical structure in which loops are nested;
    when the array sizes match the numbers of rotations, respectively, and when an initial value of each of the first index and the second index is 1 and an increment value of each of the first index and the second index is 1, replace the first argument and the second argument of the n-dimensional array included in the instruction code with a third argument and changing the n-dimensional array to an (n−1)-dimensional array; and
    integrate a first loop that uses the first index and a second loop that uses the second index.

8. A compiler method, comprising:
    determining by a computer, for an n-dimensional array (n≥3) included in an instruction code in an innermost loop of a multiple loop included in a source code, whether array sizes of a first argument and a second argument match numbers of rotations of a first index that corresponds to the first argument and a second index that corresponds to the second argument in the multiple loop, respectively, the multiple loop being a loop with a hierarchical structure in which loops are nested;
    when the array sizes match the numbers of rotations, respectively, and when an initial value of each of the first index and the second index is 1 and an increment value of each of the first index and the second index is 1, replacing the first argument and the second argument of the n-dimensional array included in the instruction code with a third argument and changing the n-dimensional array to an (n−1)-dimensional array; and integrating a first loop that uses the first index and a second loop that uses the second index.

* * * * *